Figure 1:
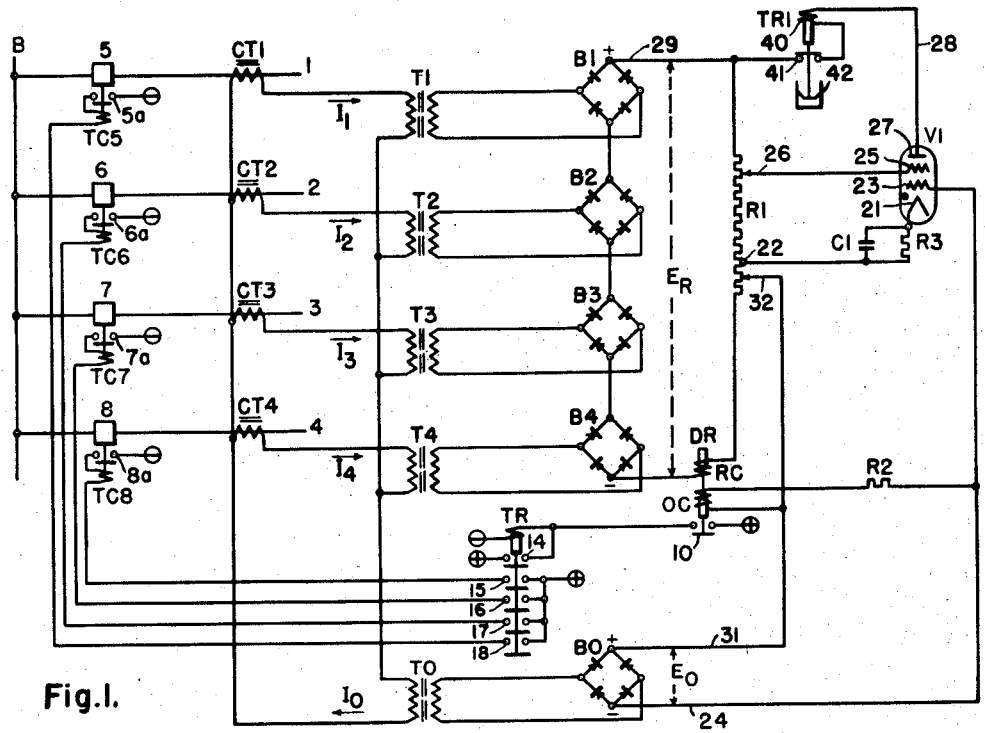

INVENTOR
William K. Sonnemann.
BY O. B. Buchanan
ATTORNEY

Patented Aug. 26, 1952

2,608,606

UNITED STATES PATENT OFFICE 2,608,606

BUS DIFFERENTIAL PROTECTION

William K. Sonnemann, Roselle Park, N. J., assignor to Westinghouse Electric Corporation, East Pittsburgh, Pa., a corporation of Pennsylvania Application June 29, 1950, Serial No. 171,127

14 Claims. (Cl. 175—294)

My invention relates to high-speed means for the differential protection of multi-circuit alternating-current buses, without involving the expense of installing special oversize iron-core line-current transformers.

My invention is particularly designed for the differential protection of those buses which are sufficiently close to a generating station so that the direct-current time-constant of an asymmetrical short-circuit current has an important effect upon the saturation of the iron-core line-current transformer in the faulted circuit, in the event of an external fault. My invention is advantageous also, however, in other less aggravated circuit-conditions, in which the asymmetrical component is not as pronounced.

My invention is predicated upon the discovery or observation that an ordinary iron-core line-current transformer requires a time-delay of somewhere between 0.3 and 0.5 cycle, on a 60-cycle basis, before it will develop enough saturation, to materially impair its accuracy, after the incidence of a fault.

My invention uses an ordinary ratio-differential relay, having an operating coil which is energized in response to the magnitude of a difference-current which is the vectorial sum of all of the currents entering or leaving the bus, and a restraining coil which is energized in response to the sum of the individual magnitudes of the bus-circuit currents, arithmetically added. Such a relay will operate properly as long as the line-current transformers are all performing with a fair degree of accuracy, that is, prior to the expiration of the above-mentioned time-delay period of the order of 0.3 to 0.5 cycle, after the incidence of a fault. During this period, I provide means for responding to the restraint-current and desensitizing the relay, if the restraint-current is not immediately opposed by an operating current.

If the fault is an internal fault, that is, a fault on the bus itself, an operating current will be produced instantly, without any time-delay, the same as the restraining current, and the relay will operate in response to that operating current. If the fault is an external fault, on one of the circuits which are connected to the bus, the operating current will be substantially zero until the expiration of a time-period which will not be shorter than 0.3 to 0.5 cycle, and during this time the relay will be desensitized so that it will stand a reasonable amount of transformer-saturation before it will operate.

Figure 2:
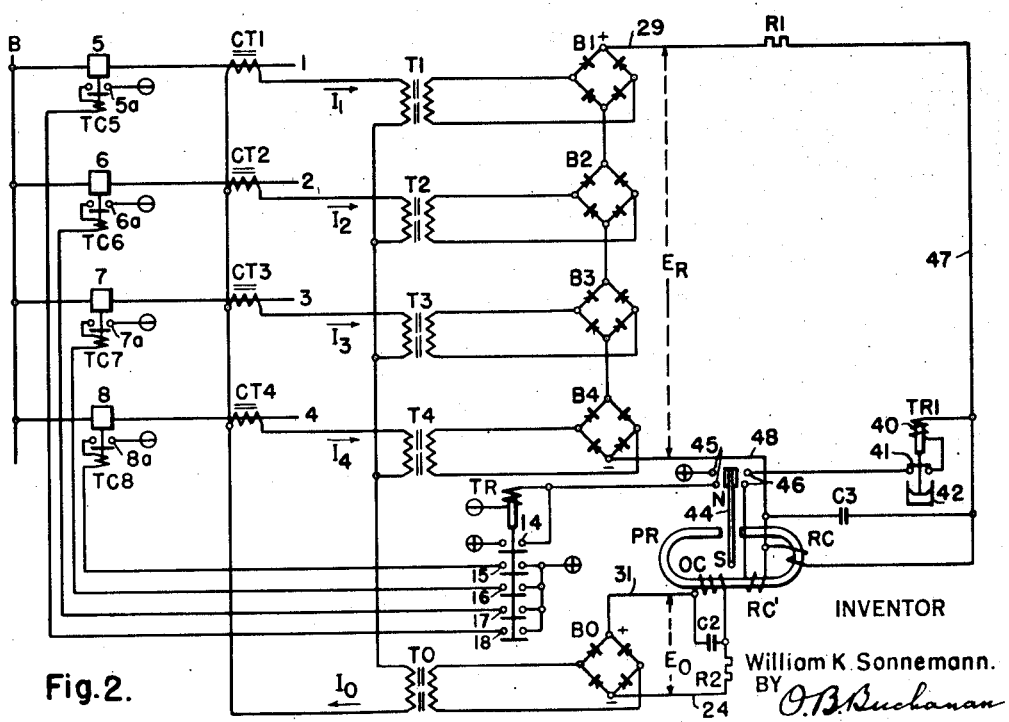

With the foregoing and other objects in view, my invention consists in the circuits, systems, combinations, apparatus, parts, and methods of design and operation, hereinafter described and claimed, and illustrated in the accompanying drawing, wherein:

Figure 1 is a single-line diagram of circuits and apparatus illustrating my invention in a preferred form of embodiment, using a mechanical or moving-part differential-current relay and an electronic means for desensitizing said relay; and Fig. 2 is a similar diagram of another illustrative form of embodiment, using an all-mechanical, or non-electronic, relay-system, and also illustrating the availablity of a different type of differential relay, which can be used with either embodiment of the invention.

In Fig. 1, I have shown my invention applied to the differential protection of an alterning-current bus B having four circuits 1, 2, 3 and 4, which are connected thereto by means of circuit-breakers 5, 6, 7 and 8, respectively. Any number of bus-circuits could be used, and these will include both power-sources and loads. The circuit-breakers are provided with auxiliary switches $5a$, $6a$, $7a$ and $8a$, and trip-coils TC5, TC6, TC7 and TC8, respectively. Ordinary iron-core line-current transformers CT1, CT2, CT3 and CT4 are used, for deriving the respective line-currents $I_1$, $I_2$, $I_3$ and $I_4$ of all of the bus-circuits, for relaying purposes.

In accordance with my invention, the line-current transformers CT1 to CT4 are connected in star, so that the star-point return-current $I_0$ will be the differential bus-current or the alternating-current vectorial sum of all of the bus-circuit currents $I_1$ to $I_4$ at any instant. The bus-circuit currents $I_1$ to $I_4$, and the residual or differential bus-current $I_0$ are each led through the primary winding of a corresponding auxiliary air-gap transformer T1 to T4 and T0, respectively. These auxiliary transformers are designed to develop a voltage in their secondaries, proportional to the rate of change of current in their primaries. They may have iron cores, but in such a case, the iron cores have to have air-gaps, so that the secondary voltage is a linear function of the primary current.

The output of each of the auxiliary transformers T1 to T4 and T0 is rectified by means of its own full-wave rectifier, such as the corresponding rectifier-bridge B1 to B4 and B0, respectively. The direct-current output-circuits of the four bus-circuit rectifier-bridges B1 to B4 are connected additively in series with each other, to produce a unidirectional restraining voltage $E_R$ which is equal (or proportional) to the sum of the magnitudes of the individual bus-circuit currents $I_1$ to $I_4$, inclusive, at any instant. The direct-current output-circuit of the differential-current rectifier-bridge B0 serves as a source of the operating voltage $E_O$ of my relay.

Any suitable differential or ratio-differential relay can be used, to respond to the operating and restraining voltages $E_O$ and $E_R$, respectively. This differential relay could be either electronic or mechanical, and if mechanical, it could be either polarized or non-polarized, and if non-polarized, it could be either of the solenoid type, or of the balanced-beam type, or of the balanced-torque type, or any other type which will perform the necessary differential functions, in the necessary responsive-time. In Fig. 1, a non-polarized differential relay DR is shown, having an operating coil OC tending to actuate the relay, and a restraining coil RC tending to restrain the relay. In Fig. 2, a polarized relay PR is shown for the same purpose, as will be subsequently described. Either relay (with suitable modification, if necessary), could be substituted for the other, or it could be replaced by any other equivalent type of differentially responsive device which would respond to the difference between an operating voltage or current and a restraining voltage or current.

In Fig. 1, the restraining coil RC is energized from the restraining voltage $E_R$ through a variable resistor R1, which may also serve as a potentiometer, as will be subsequently described; while the operating coil OC is energized from the operating voltage $E_O$ through a resistor R2. The operating coil OC is designed to be the stronger of the two coils, so that when both the operating coil OC and the restraining coil RC are fully energized, under internal-fault conditions, the pull of the operating coil OC will prevail, thus actuating the differential relay DR and closing its contact 10.

The relay-contact 10, in Fig. 1, is in an energizing circuit including the operating coil of a multi-contact tripping relay TR, which immediately seals itself in, through a contact 14 and closes other contacts 15 to 18 which are in the trip-circuits of the respective trip-coils TC5 to TC8, each tripping circuit being completed through the auxiliary breaker-contact 5a to 8a, of its respective breaker.

In accordance with my invention, the differential relaying means, such as the relay DR in Fig. 1, is provided with some sort of desensitizing means for desensitizing the relay, if it fails to make a tripping operation within the previously mentioned critical time-period of 0.3 to 0.5 cycle, after the incidence of a fault-condition. This desensitizing means may take any one of a number of different forms. Thus, it may increase the restraining force, or it may decrease the operating force, which is effective in the differential relay, such as DR. If the restraining force is to be increased, this may be done, either by cutting in more turns on the restraint-coil, or by energizing an auxiliary restraint-coil, or by increasing the current which is supplied to the restraint coil, as by cutting out some resistance in the energizing-circuit for the restraint-coil. If the operating force is to be decreased, this may be done either by cutting out some of the turns of the operating coil, or by decreasing the operating current, as by inserting a resistance in series with the operating coil, or by connecting a resistance or other impedance in shunt across the operating coil.

Various means are available for effecting a response to the incidence of a fault-condition, and for performing one of the aforementioned desensitizing-operations within the necessary time-period.

In Fig. 1, an electronic fault-responsive means is provided, in the form of a shield-grip thyratron or gas tetrode V1, having a cathode 21, which is connected, through a cathode-circuit resistor R3, to a tap-point 22 near the negative end of resistance R1. The tube V1 has a control-grid 23 which is connected to the negative output-terminal 24 of the bus-differential bridge-rectifier B0. The tube V1 also has a shield-grid 25 which is connected to an adjustable tap-point 26 near the positive end of the resistor R1. The plate 27 of the tube is connected, through a plate-circuit 28, to the positive direct-current output-terminal 29 of the four serially connected rectifier-bridges B1 to B4.

The control-circuits of the tube V1 are completed by a connection from the positive output-terminal 31 of the differential-current rectifier-bridge B0 to an adjustable tap-point 32 in the most negative portion of the resistor R1.

The tube V1 is also provided with a cathode-circuit capacitor C1, which is connected in shunt across the cathode-circuit resistor R3, for assisting in extinguishing the tube at the expiration of the conditions which caused its operation, as will be understood.

The system shown in Fig. 1 operates as follows. If an internal fault should occur, that is, a fault on the bus B, the vectorial summation of the currents entering (or leaving) the bus will be the current flowing into fault on the bus. Hence there will be a large operating voltage $E_O$, and this voltage will begin to build up at the same time when the voltages in the bus-circuit rectifier-bridges B1 to B4 begin to build up, so that the restraining voltage $E_R$ and the operating voltage $E_O$ will simultaneously appear or increase to fault-magnitude.

As the restraining voltage $E_R$ increases, the plate-voltage and the screen-grid voltage will become more positive, thus tending to cause the tube V1 to begin to carry current in its plate-cathode circuit, but this tendency will be opposed by the application of the operating voltage $E_O$ to the control-grid 23 in such polarity as to make said control-grid much more negative. The tube V1 does not become conducting, therefore, at least not right away, which is all that is necessary, because the differential relay DR immediately responds, when both its operating coil OC and its restraining coil RC become energized simultaneously; and as soon as the differential relay operates, it picks up its contact 10 and energizes the tripping relay TR which instantly seals itself in, so that the tripping circuits to the various bus-circuit breakers remain energized until the completion of the tripping operations, even though the differential relay DR should drop out immediately after closing its contact 10.

If, however, an external fault occurs, say on the bus-circuit 1 in Fig. 1, the differential bus-current $I_O$ will be zero, and the line-current transformers CT1 to CT4 will properly register a zero differential current $I_O$ as long as these transformers are performing with a fair degree of accuracy, that is, until some time after the expiration of the minimum time-delay period of 0.3 to 0.5 cycle. During this period, therefore, the operating voltage $E_O$ is zero.

Meanwhile, however, the restraining voltage $E_R$ instantly appears, and begins to build up in its first quarter-cycle, thus making the plate 27 and the shield-grid 25 more positive, and at the same time making the control-grid 23 only slightly more negative, with respect to the cathode 21, thus causing the tube V1 to commence to carry current. When this happens, the tube short-circuits most of the resistor R1, from its positive terminal 29 to its cathode-connected tap 22, thus reducing the resistance in series with the restraint-coil RC, thereby making the restraining force larger. This desensitizes the differential relay DR, so that it will not operate, even when a false operating voltage $E_o$ begins to develop as a result of saturation of the faulted-circuit current transformer CT1.

It may be noted that when the operating voltage $E_o$ appears, subsequent to the breaking down or conductive operation of the tube V1, this operating voltage $E_o$ makes the control-grid 23 more negative, but this does not interrupt the tube-current, because the tube is a gas tube which is not sensitive to grid-control, once it has become conducting.

It will be understood that each of the bus-circuits 1 to 4 will be provided with its own protective means (not shown), in accordance with ordinary relaying practice, for disconnecting any faulted circuit from the bus B. When a bus-circuit fault is thus cleared, through the operation of its own protective apparatus (not shown), there will be a sudden drop in the restraining voltage $E_R$, and hence in the plate-voltage of the tube V1. When this occurs, the cathode-circuit capacitor C1 will maintain the cathode-voltage at a value more positive than the cathode tap-point 22, for a sufficient length of time to extinguish the tube V1 when this drop in plate-voltage occurs. By this means, the apparatus is reset in readiness for the next operation.

In Fig. 1, I have also shown an additional tube-resetting means, which may be used, either instead of the tube-resetting cathode-circuit capacitor C1, or as a sort of back-up protective device supplementary thereto. I refer to a time-delay relay TR1 which is connected in the plate-circuit 28 of the tube. This time-delay relay TR1 has an operating coil 40 and a normally closed back-contact 41, both of which are connected in series with the plate-circuit 28.

When the tube V1 becomes conductive, and current flows through this time-delay relay, it begins to pick up its back-contact 41, tending to break the circuit 41, but this circuit-breaking action is retarded by a suitable means, symbolized by a dashpot 42, so that the back-contact 41 does not become opened until after a time delay which allows sufficient time for the external fault to be cleared by its own fault-clearing means (not shown), after which the tube V1 is reset by the opening of the relay-contact 41. The dashpot 42 does not materially delay the resetting of the time-delay relay TR1 after the extinction of the tube-current, and when the time-delay relay resets, the entire circuit is reset, ready for another operation. The dropping-out time of the time-delay relay TR1 is a small fraction of a cycle, which is sufficient to allow the necessary deionizing time for the tube V1.

In Fig. 2, I have shown a different form of differential relay, and also a different form of desensitizing means. The circuits which produce the operating voltage $E_o$ and the restraining voltage $E_R$ are the same in Fig. 2, as in Fig. 1.

In Fig. 2, the differential relay is shown as a polarized relay PR, having an operating coil OC, a restraining coil RC, and an auxiliary restraining coil RC'. This polarized relay PR has a polarized or permanently magnetized movable element 44, having north and south poles N and S. This movable element 44 is shown in a central position, in which it does not make contact, either with a left-hand pair of operating-contacts 45, or right-hand pair of restraining-contacts 46. This central-position showing of the movable element 44 is intended to be a schematic representation of suitable central-position biasing-means which tend always to return the relay to the illustrated central-position, when the relay is entirely deenergized.

The operating coil OC, in Fig. 2, is energized from the positive and negative terminals 31 and 24 of the operating voltage $E_o$ of the bridge B0, through a resistor R2, as before. In Fig. 2, however, I have added a shunting capacitor C2, which is connected in shunt across the operating coil OC for the purpose of smoothing the rectified voltage which is applied to this operating coil. This may be particularly necessary, at times, in order to avoid erroneous operation due to the sharp peaks which result from the saturation of the line-current transformers CT1 to CT4.

The restraint-coil RC, in Fig. 2, is energized, as before, from the restraining voltage $E_R$, in a circuit which can be traced from the positive terminal 29, through the resistance R1, a circuit 47, the restraint-coil RC, and the negative terminal 48 of the group of serially connected rectifier-bridges B4 to B1. Here again, as shown in Fig. 2, I have provided a shunting capacitor C3, which is shunted across the restraint-coil RC for smoothing the rectified voltage which is applied to this coil.

In Fig. 2, the resistors R1 and R2 serve as means for somewhat controlling the time-delay of the polarized relay PR, by requiring a definite time for a charge to build up in the respective shunting capacitors C2 and C3.

In Fig. 2, my desensitizing means is associated with the auxiliary restraint-coil RC'. The energizing circuit for this auxiliary restraining coil RC' may be traced from the conductor 47, through the timing-relay coil 40 and back-contact 41 of the timing relay TR1, and thence to the right-hand or restraining contacts 46 of the polarized relay PR, and thence to the auxiliary restraining coil RC', from which the circuit is completed at the negative conductor 48.

The operation of the system shown in Fig. 2 is essentially the same as that which has been described for Fig. 1. When an internal fault occurs on the bus B, the movable element 44 of the high-speed polarized relay PR moves over to the operating side 45 and trips out the breakers in all of the circuits 1 to 4 which are connected to the bus. When an external fault occurs, say on the bus-circuit 1, the heavy energization of the restraint-coil RC, in the absence of any immediate operating-current energization, causes the movable element 44 to move backwardly, over into engagement with the restraint-contacts 46, within the minimum time-period of 0.3 to 0.5 cycle which is available before the saturation of the line-current transformer CT1 causes the appearance of a spurious operating-voltage $E_o$ of a magnitude sufficient to cause the relay to have an operating-force in the direction of the operating contacts 45. As soon as restraining contacts 46 are bridged or closed, the restraining force is increased, by the energization of the auxiliary restraining winding RC', thus desensitizing the relay so that it is then able to withstand a spurious operating-voltage Eo without responding by moving its movable element 44 over to the operating side 45.

The polarized relay PR of Fig. 2 has to be designed so that its biasing force which tends to return the movable element 44 from the restraint-position 46 to the neutral position must be sufficiently large to overcome the double restraint of both of the restraint-coils RC and RC' after an external fault has been cleared by means of the external-circuit protective apparatus (not shown) which is provided in the faulted bus-circuit such as 1. However, if reliance is to be placed solely on the back-up or time-delay kick-out relay TR1, to restore the polarized relay PR to its neutral position after the clearing of an external fault, the biasing force of the relay does not need to be sufficiently strong to be able, under all conditions, to return the movable element 44 from its restraint-side 46 to its neutral position when both of the restraint-coils RC and RC' are energized. In any event, this biasing force, in the polarized relay PR, should be sufficient to prevent the full load current in bus-circuits 1 to 4 from developing sufficient restraint-side force to move the movable element 44 backwards into contact with the restraint-contacts 46 as a result of the energization of the restraint-coil RC when the operating coil OC is not energized.

In the above-illustrated forms of embodiment of my invention, it is desirable to design the differentially responsive relay DR or PR, as the case may be, so that it is able to respond instantly to an internal fault which occurs immediately after an external fault, and while the relay is in its desensitized condition. This may be done by causing the ampere-turns, which are received by the operating coil OC under internal-fault conditions, to be more than the total ampere-turns of the restraint-coil or coils in the desensitized condition of the relay.

While I have illustrated my invention, and described its principles, with reference to two particular illustrated forms of embodiment, I wish it to be understood, as previously indicated, that various changes may be made, in the way of substituting the different equivalent forms of the various elements of my relay-assembly, or by the way of omitting or adding parts, without departing from the essential spirit of my invention. I desire, therefore, that the appended claims shall be accorded the broadest construction consistent with their language.

I claim as my invention:

1. In combination, a multi-circuit alternating-current bus having iron-core line-current transformers in all of the respective bus-circuits, and differential bus-protecting means comprising a quick-acting differential relaying-means responsive to the difference between an operating electrical quantity and a restraining electrical quantity, means for providing said differential relaying means with an operating electrical quantity in response to the magnitude of the vectorial sum of all of the currents developed by said line-current transformers at any instant, means for providing said differential relaying means wth a restraining electrical quantity in response to the sum of the individual magnitudes of the currents developed by said line-current transformers at any instant, said differential relaying-means being able to discriminate as to the relative magnitudes of said operating and restraining quantities, and quick-acting self-resetting relay-desensitizing means for desensitizing said differential relaying-means in response to a fault-magnitude of said restraining electrical quantity which is not immediately opposed by an operating electrical quantity, said relay-desensitizing means being operative within a time which is less than the saturation-time of the line-current transformers during asymmetrical fault-currents.

2. The invention as recited in claim 1, characterized by said self-resetting relay-desensitizing means including means for removing said desensitizing effect in response to a diminution of said restraining electrical quantity from a fault-magnitude to a load-condition magnitude.

3. The invention as defined in claim 1, characterized by said self-resetting relay-desensitizing means including means for resetting said desensitizing means in response to a predetermined time-delay after the occurrence of the conditions which cause its operation.

4. The invention as defined in claim 1, characterized by said desensitizing means comprising a gas tube having a breakdown-initiating controlling-means, means for energizing said tube in such a way as to tend to cause said tube to commence to carry plate-current in response to a fault-magnitude of said restraining electrical quantity, and means for energizing the controlling-means of said tube in such a way as to prevent the breakdown of the tube in response to said operating electrical quantity.

5. The invention as defined in claim 1, characterized by said desensitizing means comprising a gas tube having a breakdown-initiating controlling-means, means for energizing said tube in such a way as to tend to cause said tube to commence to carry plate-current in response to a fault-magnitude of said restraining electrical quantity, and means for energizing the controlling-means of said tube in such a way as to prevent the breakdown of the tube in response to said operating electrical quantity, said tube having a cathode-circuit resistor, shunted by a capacitor of sufficient size to interrupt the current-conduction of said tube in response to a sudden diminution of said restraining electrical quantity from a fault-magnitude to a load-condition magnitude.

6. The invention as defined in claim 1, characterized by said differential relaying-means having a three-position movable element, having a central position, an operating position, and a restraint-position, contact-means controlled by said operating and restraint-positions, respectively, and biasing means for normally holding said movable element in its central position.

7. The invention as defined in claim 1, characterized by said line-current transformers being connected in star, separate means, in series with the respective line-current transformers, and in series with the star-connection circuit thereof, for developing alternating-current voltages responsive to the respective currents, a separate full-wave rectifying-means associated with each of said voltage-developing means for rectifying the voltage thereof, and circuit-means for serially connecting the output-circuits of each of the rectifying-means which are associated with the several line-current transformers, for providing said restraining electrical quantity, the output-circuit of said star-connection rectifying-means providing said operating electrical quantity.

8. In combination, a multi-circuit alternating-current bus having iron-core line-current transformers in all of the respective bus-circuits, and differential bus-protecting means comprising a quick-acting differential relaying-means responsive to the difference between an operating electrical quantity and a restraining electrical quantity, means for providing said differential relaying means with an operating electrical quantity in response to the magnitude of the vectorial sum of all of the currents developed by said line-current transformers at any instant, means for providing said differential relaying means with a restraining electrical quantity in response to the sum of the individual magnitudes of the currents developed by said line-current transformers at any instant, said differential relaying-means being able to discriminate as to the relative magnitudes of said operating and restraining quantities, and quick-acting self-resetting relay-blocking means for blocking an effective erroneous operation of said differential relaying-means, said relay-blocking means operating in response to a fault-magnitude of said restraining electrical quantity which is not immediately opposed by an operating electrical quantity, said relay-blocking means being operative within a time which is less than the saturation-time of the line-current transformers during asymmetrical fault-currents.

9. The invention as recited in claim 8, characterized by said self-resetting relay-blocking means including means for removing said blocking effect in response to a diminution of said restraining electrical quantity from a fault-magnitude to a load-condition magnitude.

10. The invention as defined in claim 8, characterized by said self-resetting relay-blocking means including means for resetting said blocking means in response to a predetermined time-delay after the occurrence of the conditions which caused its operation.

11. The invention as defined in claim 8, characterized by said blocking means comprising a gas tube having a breakdown-initiating controlling-means, means for energizing said tube in such a way as to tend to cause said tube to commence to carry plate-current in response to a fault-magnitude of said restraining electrical quantity, and means for energizing the controlling-means of said tube in such a way as to prevent the breakdown of the tube in response to said operating electrical quantity.

12. The invention as defined in claim 8, characterized by said blocking means comprising a gas tube having a breakdown-initiating controlling-means, means for energizing said tube in such a way as to tend to cause said tube to commence to carry plate-current in response to a fault-magnitude of said restraining electrical quantity, and means for energizing the controlling-means of said tube in such a way as to prevent the breakdown of the tube in response to said operating electrical quantity, said tube having a cathode-circuit resistor, shunted by a capacitor of sufficient size to interrupt the current-conduction of said tube in response to a sudden diminution of said restraining eelctrical quantity from a fault-magnitude to a load-condition magnitude.

13. The invention as defined in claim 8, characterized by said differential relaying-means having a three-position movable element, having a central position, an operating position, and a restraint-position, contact-means controlled by said operating and restraint-positions, respectively, and biasing means for normally holding said movable element in its central position.

14. The invention as defined in claim 8, characterized by said line-current transformers being connected in star, separate means, in series with the respective line-current transformers, and in series with the star-connection circuit thereof, for developing alternating-current voltages responsive to the respective currents, a separate full-wave rectifying-means associated with each of said voltage-developing means for rectifying the voltage thereof, and circuit-means for serially connecting the output-circuits of each of the rectifying-means which are associated with the several line-current transformers, for providing said restraining electrical quantity, the output-circuit of said star-connection rectifying-means providing said operating electrical quantity.

WILLIAM K. SONNEMANN.

REFERENCES CITED

The following references are of record in the file of this patent:

UNITED STATES PATENTS

| Number | Name | Date |
| --- | --- | --- |
| 2,240,699 | Harder et al. | May 6, 1941 |
| 2,289,149 | Sonnemann | July 7, 1942 |
| 2,508,198 | Sonnemann | May 16, 1950 |